(12) United States Patent
Son et al.

(10) Patent No.: US 9,915,844 B2
(45) Date of Patent: Mar. 13, 2018

(54) LIQUID CRYSTAL DISPLAY AND METHOD OF MANUFACTURING THE SAME

(71) Applicant: Samsung Display Co., Ltd., Yongin-wi, Gyeonggi-do (KR)

(72) Inventors: Ock Soo Son, Seoul (KR); Dong Wook Kim, Seoul (KR); Jean Ho Song, Yongin-si (KR); Eun Je Jang, Seongnam-si (KR); Do Hyun Jung, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/096,502

(22) Filed: Apr. 12, 2016

(65) Prior Publication Data

US 2016/0357080 A1    Dec. 8, 2016

(30) Foreign Application Priority Data

Jun. 8, 2015 (KR) .................. 10-2015-0080381

(51) Int. Cl.
*G02F 1/1343* (2006.01)
*G02F 1/1362* (2006.01)

(52) U.S. Cl.
CPC .......... *G02F 1/136227* (2013.01); *G02F 2001/134372* (2013.01); *G02F 2001/136222* (2013.01)

(58) Field of Classification Search
CPC ... G02F 1/136227; G02F 2001/134372; G02F 2001/136222

USPC ......................................... 349/141
See application file for complete search history.

(56) References Cited

U.S. PATENT DOCUMENTS

2012/0314169 A1* 12/2012 Naoe ............... G02F 1/133345
                                                              349/138
2013/0100386 A1*  4/2013 Kim ................ G02F 1/13394
                                                              349/110

FOREIGN PATENT DOCUMENTS

KR    1020090126767 A    12/2009
KR    1020110052159 A     5/2011
KR    1020120067288 A     6/2012

* cited by examiner

*Primary Examiner* — Lucy Chien
(74) *Attorney, Agent, or Firm* — Cantor Colburn LLP

(57) ABSTRACT

A liquid crystal display device includes first and second substrates facing each other; a liquid crystal layer between the first and second substrates; a thin-film transistor ("TFT") on the first substrate and including a semiconductor layer and a gate, source and drain electrodes; an organic layer on the TFT and defining a contact hole therein which exposes a portion of the drain electrode; a conductive layer on the organic layer and contacting the exposed portion of the drain electrode at the contact hole; a common electrode which is on the organic layer and isolated from the conductive layer; a passivation layer on the conductive layer and the common electrode and defining an opening therein which exposes a portion of the conductive layer; and a pixel electrode on the passivation layer and the conductive layer and contacting the exposed portion of the conductive layer at the opening.

18 Claims, 7 Drawing Sheets

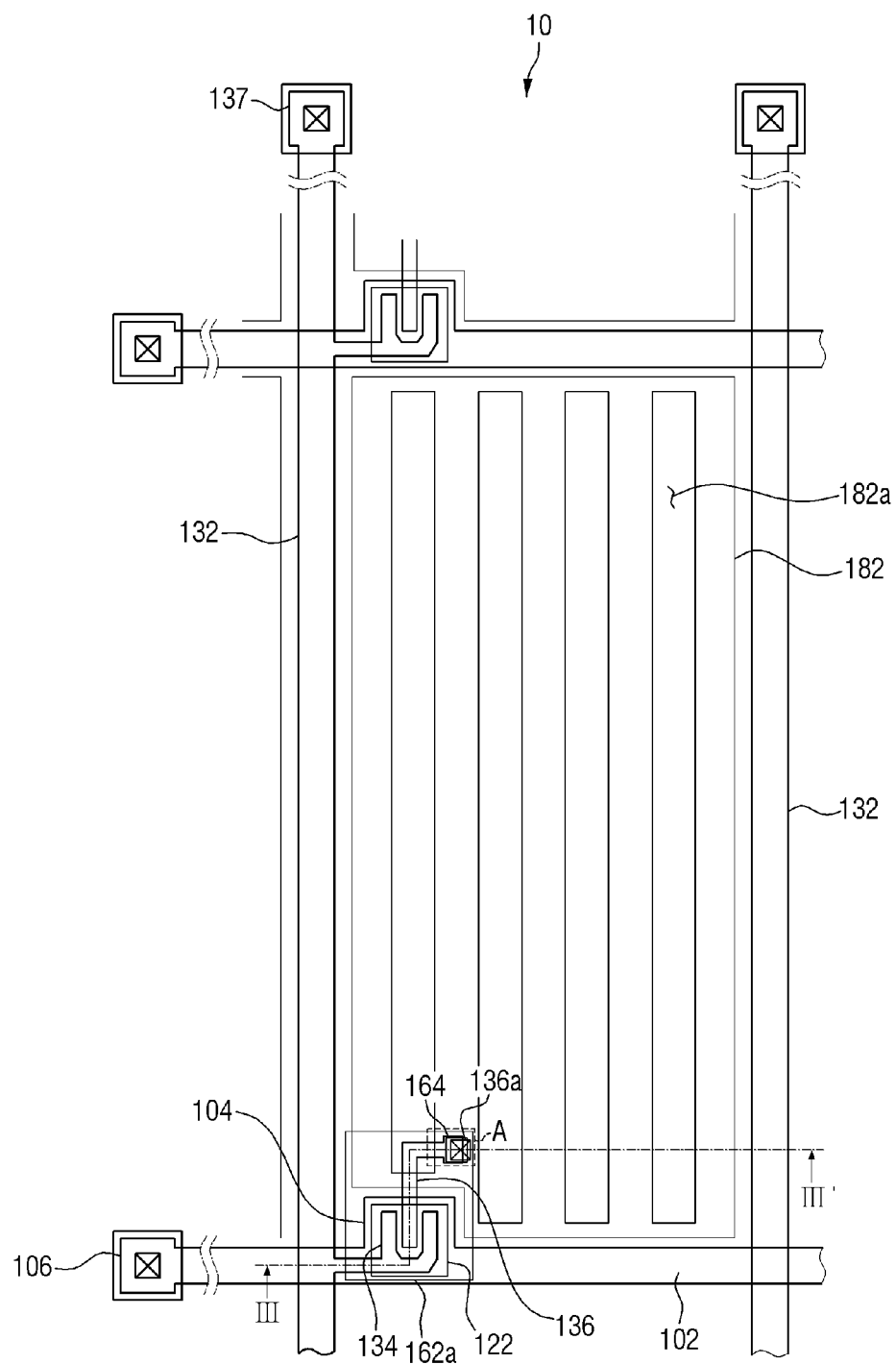
[FIG. 1]

[FIG. 2]
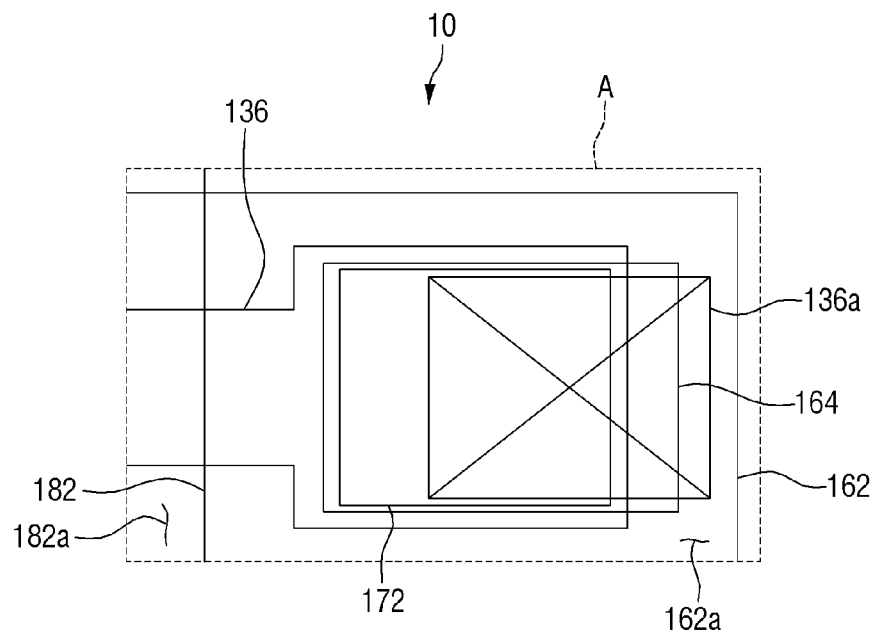
[FIG. 3]
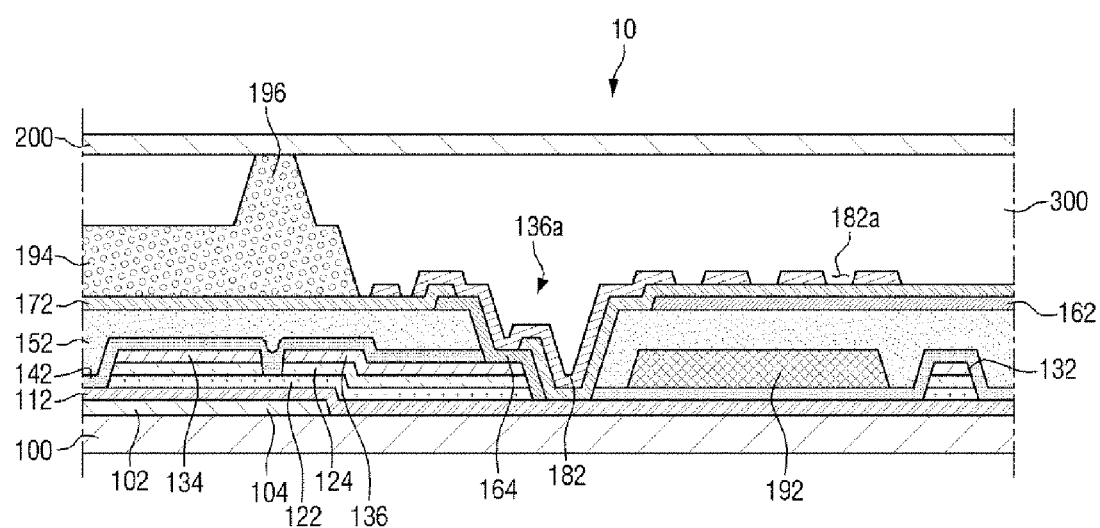

【FIG. 4】
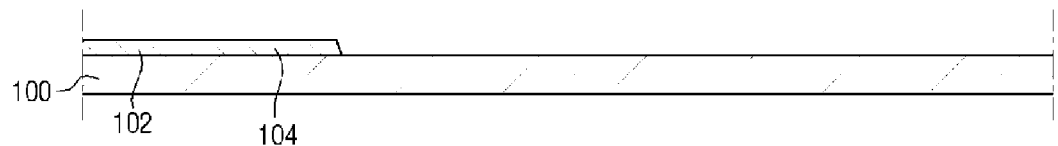
【FIG. 5】
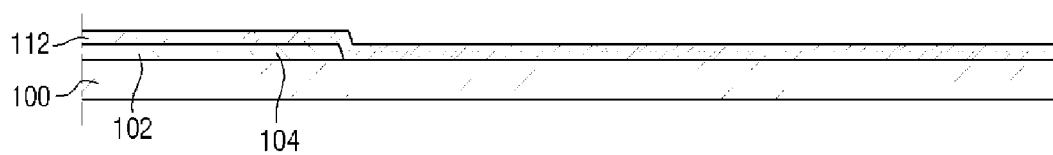
【FIG. 6】
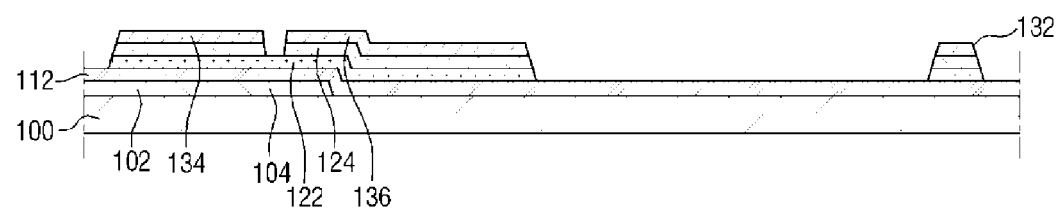
【FIG. 7】
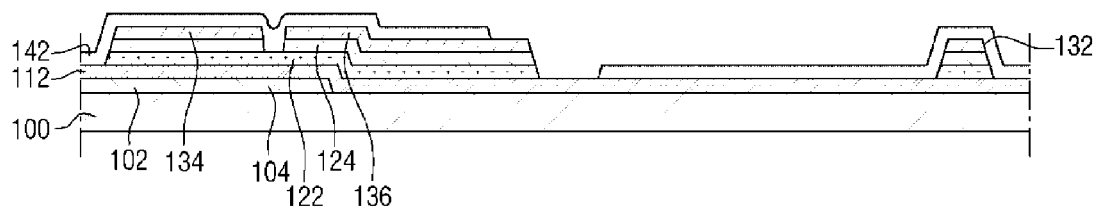

【FIG. 8】
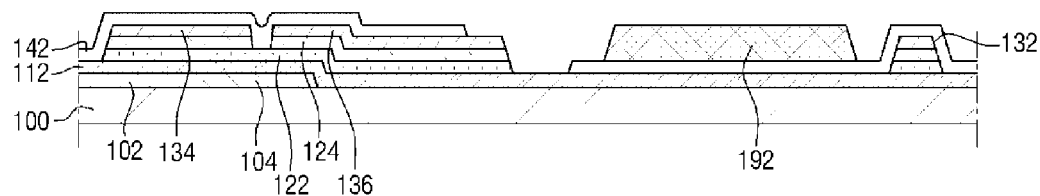
【FIG. 9】
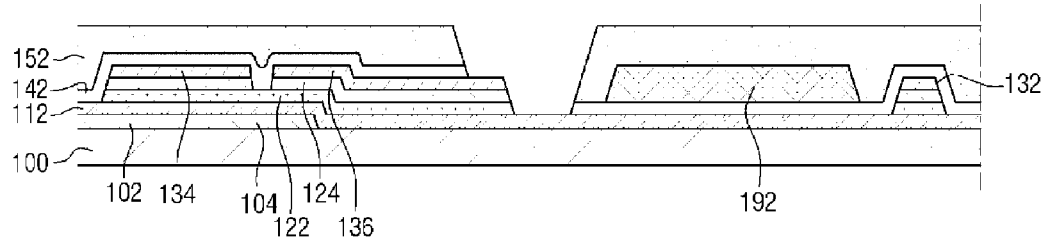
【FIG. 10】
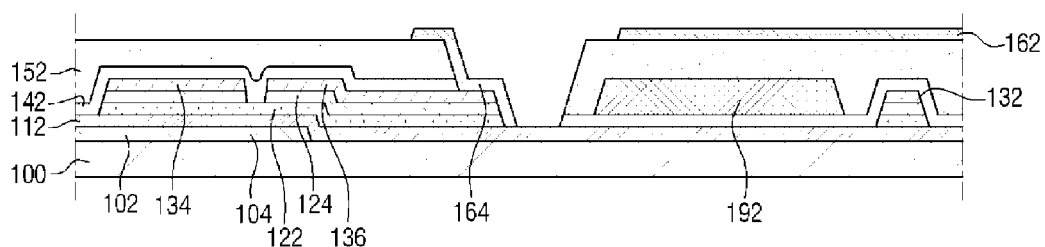

[FIG. 11]
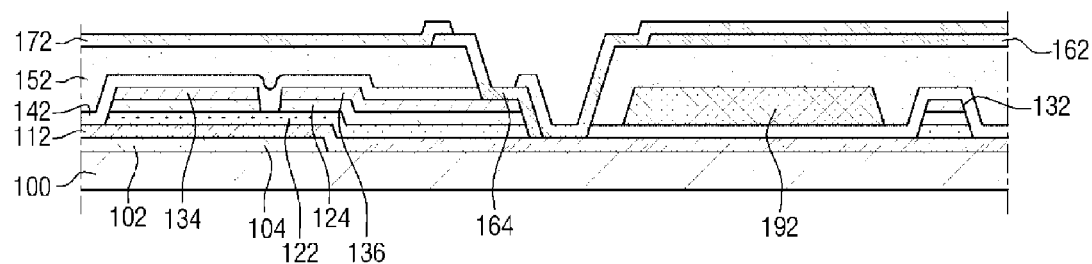
[FIG. 12]
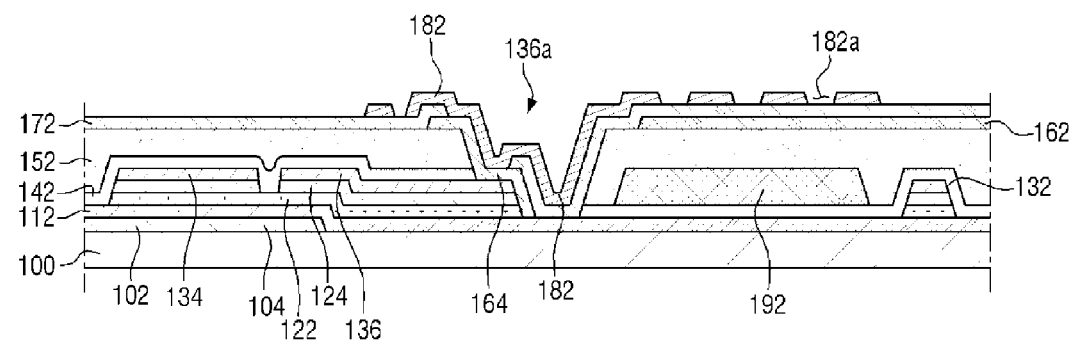

[FIG. 13]
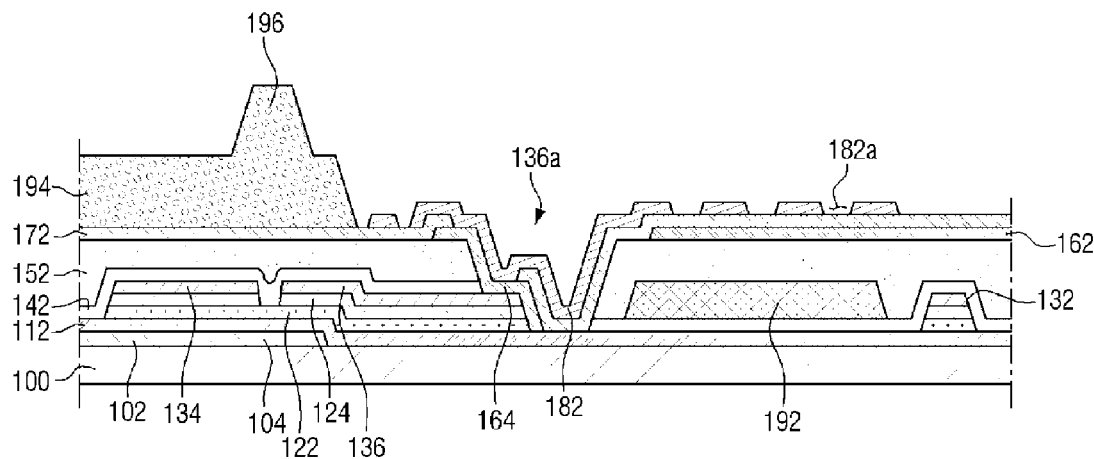
[FIG. 14]
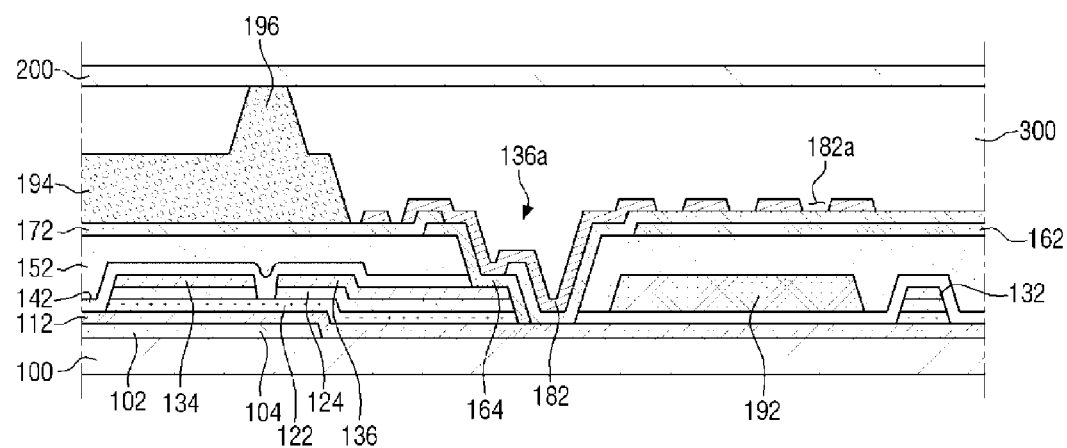

【FIG. 15】
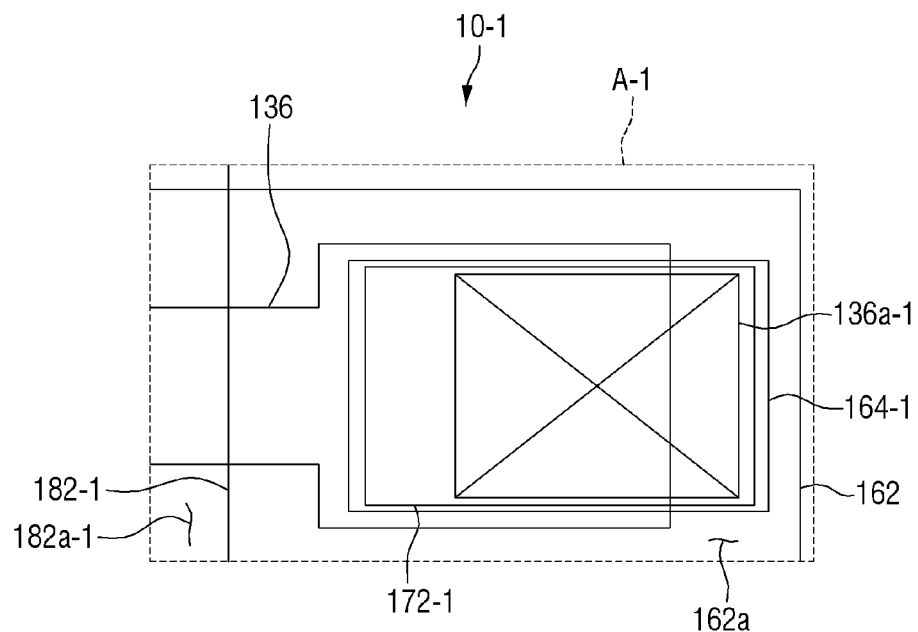
【FIG. 16】
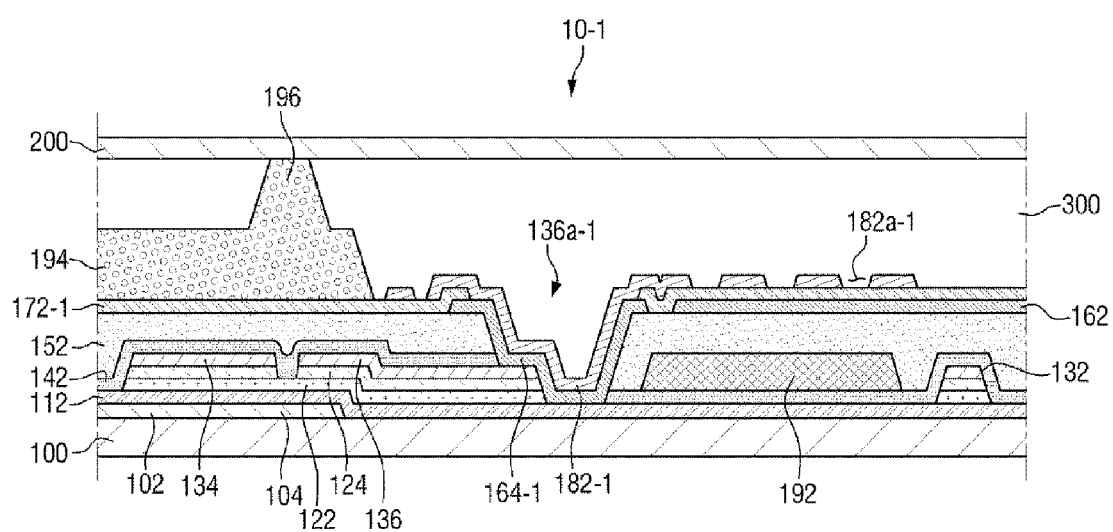

LIQUID CRYSTAL DISPLAY AND METHOD OF MANUFACTURING THE SAME

This application claims priority to Korean Patent Application No. 10-2015-0080381 filed on Jun. 8, 2015, and all the benefits accruing therefrom under 35 U.S.C. § 119, the disclosure of which is incorporated herein by reference in its entirety.

BACKGROUND

1. Field

The invention relates to a liquid crystal display ("LCD") and a method of manufacturing the same.

2. Description of the Related Art

A liquid crystal display ("LCD") is a display device realizing an image using the electrical and optical properties of a liquid crystal material, i.e., by varying optical transmittance according to the intensity of an electric field. The LCD includes a plurality of pixels. In each of the pixels, a pixel electrode and a color filter are disposed. The pixel electrode is driven by a thin-film transistor ("TFT").

The LCD also includes first and second display substrates, which face each other. The TFT and the pixel electrode are disposed in the first display substrate. Traditionally, the color filter is disposed in the second display substrate. However, a color filter-on-array ("COA") structure has been introduced in which the color filter is disposed in the first display substrate along with the TFT. In the COA structure, a capping layer is provided above the color filter so as to prevent the color filter from being lifted or separated.

SUMMARY

Exemplary embodiments of the invention provide a liquid crystal display ("LCD") having a structure which reduces or effectively prevents an active unfilled area ("AUA") defect.

Exemplary embodiments of the invention also provide a method of manufacturing an LCD, which reduces or effectively prevents an organic layer and a pixel electrode from contacting each other so as to prevent an AUA defect.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a liquid crystal display ("LCD") includes: first and second substrates facing each other; a liquid crystal layer disposed between the first and second substrates; a thin-film transistor ("TFT") disposed on the first substrate and including a semiconductor layer, a gate electrode, a source electrode and a drain electrode; an organic layer disposed on the TFT and defining a contact hole therein which exposes a portion of the drain electrode; a conductive layer disposed on the organic layer and contacting the exposed portion of the drain electrode at the contact hole; a common electrode which is disposed on the organic layer and isolated from the conductive layer; a passivation layer disposed on the conductive layer and the common electrode and defining an opening therein which exposes a portion of the conductive layer; and a pixel electrode disposed on the passivation layer and the conductive layer and contacting the exposed portion of the conductive layer at the opening.

In an exemplary embodiment, the conductive layer and the passivation layer may be disposed between the pixel electrode and the organic layer such that the pixel electrode and the organic layer do not to contact each other.

In an exemplary embodiment, the opening may expose a central portion of the conductive layer and the passivation layer may cover edges of the conductive layer.

In an exemplary embodiment, the conductive layer may extend along a sidewall of the organic layer at the contact hole to be disposed on a top surface of the organic layer.

In an exemplary embodiment, the pixel electrode may contact an entirety of the exposed portion of the conductive layer at the opening.

In an exemplary embodiment, the LCD may further include: a gate insulating layer disposed between the gate electrode and the drain electrode, and the contact hole may expose a portion of the gate insulating layer.

In an exemplary embodiment, the passivation layer may directly contact the exposed portion of the gate insulating layer.

In an exemplary embodiment, the LCD may further include: a color filter disposed between the gate insulating layer and the organic layer.

In an exemplary embodiment, the LCD may further include: a light-blocking member disposed on the passivation layer.

According to another exemplary embodiment of the invention, a method of manufacturing an LCD includes: forming a TFT which includes a semiconductor layer, a gate electrode, a source electrode and a drain electrode, on a first substrate; forming an organic layer which defines a contact hole therein exposing a portion of the drain electrode, on the TFT; forming a conductive layer which contacts the exposed portion of the drain electrode at the contact hole, on the organic layer; forming a common electrode which is disposed on the organic layer and isolated from the conductive layer; forming a passivation layer which defines an opening therein exposing a portion of the conductive layer, on the conductive layer and the common electrode and; and forming a pixel electrode which contacts the exposed portion of the conductive layer at the opening, on the passivation layer and the conductive layer.

In an exemplary embodiment, the conductive layer and the passivation layer may be disposed between the pixel electrode and the organic layer such that the pixel electrode and the organic layer do not to contact each other.

In an exemplary embodiment, the opening may expose a central portion of the conductive layer and the passivation layer may cover edges of the conductive layer.

In an exemplary embodiment, the conductive layer may extend along a sidewall of the organic layer at the contact hole to be disposed on a top surface of the organic layer.

In an exemplary embodiment, the pixel electrode may contact an entirety of the exposed portion of the conductive layer at the opening.

In an exemplary embodiment, the method may further include: forming a gate insulating layer between the gate electrode and the drain electrode, and the contact hole may expose a portion of the gate insulating layer.

In an exemplary embodiment, the passivation layer may directly contact the exposed portion of the gate insulating layer.

In an exemplary embodiment, the method may further include: forming a color filter between the gate insulating layer and the organic layer.

In an exemplary embodiment, the method may further include: forming a light-blocking member on the passivation layer.

In an exemplary embodiment, the method may further include: forming a column spacer on the light-blocking member, and the light-blocking member and the column spacer may be integrally formed.

In an exemplary embodiment, the conductive layer and the common electrode may be formed at the same time using a single mask.

According to one or more exemplary embodiment, a structure is provided in which an organic layer and a pixel electrode do not contact each other, and thus an AUA defect is reduced or effectively prevented.

Also, one or more exemplary embodiment provides a method to manufacture an LCD in which an organic layer and a pixel electrode do not contact each other, and thus to prevent an AUA defect.

Other features and exemplary embodiments will be apparent from the following detailed description, the drawings, and the claims.

BRIEF DESCRIPTION OF THE DRAWINGS

The above and other advantages and features of this disclosure will become more apparent by describing in further detail exemplary embodiments thereof with reference to the accompanying drawings, in which:

FIG. 1 is a plan view of an exemplary embodiment of a thin-film transistor ("TFT") substrate of a liquid crystal display ("LCD") according to the invention.

FIG. 2 is an enlarged plan view of area A of FIG. 1.

FIG. 3 is a cross-sectional view taken along line III-III' of FIG. 1.

FIGS. 4 to 14 are cross-sectional views illustrating an exemplary embodiment of a method of manufacturing an LCD, according to the invention.

FIG. 15 is an enlarged plan view of another exemplary embodiment of an area of an LCD according to the invention, corresponding to area A of FIG. 1.

FIG. 16 is a cross-sectional view of an exemplary embodiment of the LCD of FIG. 15, corresponding to line III-III' of FIG. 1.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain features of the present description.

The description that one element is connected to or coupled to another element includes both a case where the one element is directly connected to the another element or a case where further another element is interposed between the elements. However, the description that one element is directly connected or directly coupled to another element indicates that there is no further another element between the elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The term "and/or" includes any and all combinations of one or more of the associated listed items.

A singular expression in the present specification also includes a plural expression. As used herein, the singular forms "a," "an," and "the" are intended to include the plural forms, including "at least one," unless the content clearly indicates otherwise. "Or" means "and/or."

The terms "comprise" and/or "comprising" do not exclude the possibility of existence or addition of one or more other components, steps, operations, and/or devices.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In a color filter-on-array ("COA") structure, the color filter generally includes or is formed as an organic layer and has a certain level of flexibility, whereas the capping layer includes or is formed as an inorganic layer and is less flexible and less compressible than the color filter. Accordingly, in response to the capping layer, which is relatively hard and stiff, being formed on the color filter, which is soft, a relatively large amount of stress may be caused to the capping layer.

Gases such as $H_2$, $N_2$, and the like between the capping layer and the color filter may remain unreleased due to the capping layer. As a result, in response to heat or shock being applied after the injection of a liquid crystal material between the display substrates, cracks may be readily formed near a through hole at which the thin-film transistor ("TFT") and the pixel electrode are connected to each other. With the cracks, the above-described gases may infiltrate into the liquid crystal layer through the cracks and may thus grow into bubbles, thereby undesirably causing an active unfilled area ("AUA") defect or a light leakage phenomenon.

Exemplary embodiments will hereinafter be described with reference to the accompanying drawings.

FIG. 1 is a plan view of an exemplary embodiment of a thin-film transistor ("TFT") substrate of a liquid crystal display ("LCD") according to the invention. FIG. 2 is an enlarged plan view of area A of FIG. 1. More specifically, FIG. 2 illustrates the relationship of the arrangement of a conductive layer 164, a first protective layer 172 and a drain electrode 136 of the LCD. FIG. 3 is a cross-sectional view taken along line III-III' of FIG. 1.

Referring to FIGS. 1 to 3, an LCD 10 includes first and second substrates 100 and 200, which face each other, and a liquid crystal layer 300, which is interposed between the first and second substrates 100 and 200. The first and second substrate 100 and 200 may respectively serve as base substrates of two display panel substrates of the LCD 10. The LCD 10 includes a plurality of pixels defined therein.

The first and second substrates 100 and 200 may include an insulating material such as transparent glass, quartz, ceramic, silicon or transparent plastic, and the material of the first and second substrates 100 and 200 may be appropriately selected. The first and second substrates 100 and 200 may be disposed to face each other.

Gate wiring 102, 104 and 106 is disposed on the first substrate 100. The gate wiring 102, 104 and 106 may include or be formed of an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), titanium (Ti) or tantalum (Ta). The gate wiring 102, 104 and 106 may have a single layer structure, or may have a multilayer structure including two conductive layers having different physical properties from each other. In an exemplary embodiment, for example, one of the two conductive layers in the multilayer structure may include or be formed of an Al-based metal, an Ag-based metal or a Cu-based metal and the other conductive layer may be formed of a Mo-based metal, Cr, Ti or Ta. Examples of the two conductive layers in the multilayer structure also include a Cr lower layer and an Al upper layer and an Al lower layer and a Mo upper layer. However, the invention is not limited to this, and the gate wiring 102, 104 and 106 may include or be formed of various metals and conductors other than those set forth herein.

The gate wiring 102, 104 and 106 may include a gate line 102, a gate electrode 104 and a gate pad 106. The gate line 102, the gate electrode 104 and the gate pad 106 may be provided in plural.

The gate line 102 is disposed to lengthwise extend in a first direction, for example, a horizontal direction in FIG. 1. For each pixel, the gate electrode 104 is connected to the gate line 102. The gate electrode 104 may be branched off from the gate line 102 in a direction towards a TFT or may be defined as an extension of the gate line 102, but the invention is not limited thereto. That is, the gate electrode 104 may be defined in the overlapping area of the gate line 102 and the TFT on a path of the lengthwise extension of the gate line 102.

The gate pad 106 may be disposed at a distal end of the gate line 102. In order to increase the contact area of the gate pad 106 with an external circuit line (not shown), the gate pad 106 may have an expanded width compared to that of the gate line 102. In an exemplary embodiment, the gate pad 106 may not be provided such that a gate signal may be directly applied to the gate line 102. The width of the gate pad 106 and the gate line 102 may be taken in a direction perpendicular to the lengthwise extension of the gate line 102.

In an exemplary embodiment, a gate signal is applied to the gate pad 106 and transmitted along the gate line 102, which provides a gate voltage to the gate electrode 104.

A gate insulating layer 112 is disposed on the gate wiring 102, 104 and 106. The gate insulating layer 112 may include or be formed of, for example, silicon nitride (SiNx) or silicon oxide ($SiO_2$). The gate insulating layer 112 may insulate the gate wiring 102, 104 and 106 from a data line 132 which is disposed above both the gate wiring 102, 104 and 106 and the gate insulating layer 112.

A semiconductor layer 122 is disposed on the gate insulating layer 112, and may include or be formed of, for example, hydrogenated amorphous silicon or polycrystalline silicon. The semiconductor layer 122 may be disposed to at least partially overlap the gate electrode 104. The semiconductor layer 122 may form a portion of the TFT together with the gate electrode 104, a source electrode 134 and a drain electrode. A portion of the semiconductor layer 122 exposed between the source electrode 134 and the drain electrode 136 to form a channel of the TFT.

The semiconductor layer 122 may have various shapes such as an island (e.g., discrete) shape or a lengthwise extended linear shape. The semiconductor layer 122 is illustrated in FIG. 3 as having a linear shape, but the invention is not limited thereto. In response to the semiconductor layer 122 having the linear shape, the semiconductor layer 122 may overlap data wiring 132, 134, 136 and 137. The semiconductor layer 122 may be provided in a space where the source electrode 134 and the drain electrode 136 are opposite to, and isolated from, each other, and may thus form a channel area of the TFT.

A resistive contact layer 124, which includes or is formed of n+ hydrogenated amorphous silicon doped with a relatively high concentration of n-type impurities, may be disposed on the semiconductor layer 122. The resistive contact layer 124 is disposed between the source electrode 134 and the drain electrode 136 and thus reduces the contact resistance between the source electrode 134 and the drain electrode 136.

The resistive contact layer 124, like the semiconductor layer 122, may have various shapes such as an island shape or a linear shape. In response to the semiconductor layer 122 having the linear shape, the resistive contact layer 124 may also be disposed in a linear shape corresponding to that of the semiconductor layer 122. The resistive contact layer 124 may overlap the data wiring 132, 134, 136 and 137 and may have substantially the same planar shape or pattern as that of the data wiring 132, 134, 136 and 137. Accordingly, the resistive contact layer 124, unlike the semiconductor layer 122, is disconnected at the space where the source electrode 134 and the drain electrode 136 are opposite to and isolated from each other, and thus exposes the semiconductor layer 122 therebelow.

The data wiring 132, 134, 136 and 137 is disposed on the resistive contact layer 124 and the gate insulating layer 112. The data wiring 132, 134, 136 and 137, like the gate wiring 102, 104 and 106, may include or be formed of Al, Cu, Ag, Mo, Cr, Ti, Ta or an alloy thereof. The data wiring 132, 134, 136 and 137 may have a single layer structure or may have a multilayer structure including a refractive metal lower layer (not illustrated) and a low-resistance upper layer (not illustrated), but the invention is not limited thereto.

The data wiring 132, 134, 136 and 137 may collectively include the data line 132, the source electrode 134, the drain electrode 136 and a data pad 137. The data line 132, the source electrode 134, the drain electrode 136 and the data pad 137 may be provided in plural.

The data line 132 may be disposed to lengthwise extend in a second direction, for example, a vertical direction in FIG. 1, which intersects the first direction. The source electrode 134 is connected to the data line 132 for each pixel. The source electrode 134 may be branched off from the data line 132 toward the TFT or may be defined as an extension of the data line 132, but the invention is not limited thereto. That is, the source electrode 134 may be defined at the overlapping area of the data line 132 and the TFT along a path of the lengthwise extension of the data line 132.

The drain electrode 136 may be disposed to be isolated from the source electrode 134. The drain electrode 136 may be electrically connected to a pixel electrode 182. A portion of the semiconductor layer 122 may be exposed between the drain electrode 136 and the source electrode 134.

The data pad 137 may be defined at a distal end of the data line 132. In order to increase the contact area of the data pad 137 with an external circuit line (not shown), the data pad 137 may have an expanded width compared to that of the data line 132. The width of the data pad 137 and the data line 132 may be taken in a direction perpendicular to the lengthwise extension of the data line 132.

A data signal is applied to the data pad 137 and transmitted along the data line 132, which provides a data voltage to the source electrode 134. In response to the gate voltage provided to the gate electrode 104, a gate-on voltage is applied to the gate electrode 104 below the source electrode 134 to turn on the TFT, and with the turned on TFT, the data voltage provided to the source electrode 134 may be transmitted to the drain electrode 136 so that the pixel electrode 182 may be charged with the data voltage.

A first passivation layer 142 is disposed on the data wiring 132, 134, 136 and 137 and an exposed portion of the semiconductor layer 122. A contact hole 136a, which exposes a portion of the drain electrode 136, may be defined in the first passivation layer 142.

The first passivation layer 142 may include, for example, an inorganic material, such as silicon nitride or silicon oxide, or a material which is formed by plasma enhanced chemical vapor deposition ("PECVD"), such as a-Si:C:O or a-Si:O:F.

A color filter 192 may be disposed on the first passivation layer 142. Examples of the color filter 192 may include a red (R) filter, a green (G) filter and a blue (B) filter, but the invention is not limited thereto. Each of the R, G and B filters is disposed in a pixel, thereby forming an R, G or B pixel. The color filter 192 may be disposed to overlap the pixel electrode 182. The color filter 192 may include a photosensitive organic composition including a pigment.

An organic layer 152 may be disposed on the color filter 192 and may thus planarize a height difference formed by the color filter 192 with other layers on the first substrate 100. The contact hole 136a may be defined in the organic layer 152 and expose the drain electrode 136. More specifically, a portion of the drain electrode 136 is exposed by the contact hole 136a which is defined extended through the first passivation layer 142 and the organic layer 152. The organic layer 152 may include a material having excellent planarization performance and photosensitivity.

The color filter 192 may be covered by the organic layer 152. That is, the color filter 192 may be completely covered by the organic layer 152 and thus may not be exposed, but the invention is not limited thereto.

A common electrode 162, a conductive layer 164 and a second passivation layer 172 may be disposed on the organic layer 152. The organic layer 152 may be completely covered by the common electrode 162, the conductive layer 164 and the second passivation layer 172. That is, at least one of the common electrode 162, the conductive layer 164 and the second passivation layer 172 may be completely disposed on the organic layer 152, and as a result, the organic layer 152 may not be exposed, but the invention is not limited thereto.

The common electrode 162 may be disposed on the organic layer 152. The common electrode 162 receives a common voltage and thus forms an electric field together with the pixel electrode 182. As illustrated in FIGS. 1 and 2, the common electrode 162 may include defined therein an opening 162a, which is rectangular in the plan view and exposes an area where the TFT and the contact hole 136a are disposed, but the invention is not limited thereto. That is, the shape and location of the opening 162a are not limited to those set forth herein.

In the LCD, a pixel may be provided with a pixel region or may also be provided with a plurality of pixel regions. The common electrode 162 may be disposed to extend in an entire pixel region except for an area at the opening 162a. In an exemplary embodiment, the pixel region may be surrounded by the gate line 102 and the data line 132, but the invention is not limited thereto.

The conductive layer 164 may be disposed to be electrically connected to the drain electrode 136, which is exposed through the contact hole 136a defined in the first passivation layer 142 and the organic layer 152.

In the exemplary embodiment as illustrated in FIGS. 2 and 3, the contact hole 136a defined in the first passivation layer 142 and the organic layer 152 may expose a portion of the drain electrode 136 and portion of the gate insulating layer 112, but the invention is not limited thereto. In an alternative exemplary embodiment, the contact hole 136a may expose portion of the drain electrode 136, but not the gate insulating layer 112.

The conductive layer 164 may be disposed to contact the exposed portion of the drain electrode 136 and may thus be electrically connected to the drain electrode 136. The conductive layer 164 may also be electrically connected to the pixel electrode 182. The pixel electrode 182 may be electrically connected to the drain electrode 136 through the conductive layer 164. That is, the conductive layer 164 may serve as a contact electrode or wiring mediating the electrical connection between the drain electrode 136 and the pixel electrode 182.

The conductive layer 164 is illustrated in FIG. 2 as contacting the entire exposed portion of the drain electrode 136, but the invention is not limited thereto. That is, the conductive layer 164 may be disposed in various other manners than that set forth herein, as long as the conductive layer 164 is electrically connected to the drain electrode 136.

As illustrated in FIG. 3, the conductive layer 164 may contact the entire exposed portion of the drain electrode 136 and may extend along the sidewall of the contact hole 136a to reach the top surface of the organic layer 152. That is, a first end of the conductive layer 164 may be disposed on the top surface of the organic layer 152, and the conductive layer 164 may extend to dispose a second end of the conductive layer 164 opposite to the first end thereof in contact with a portion of the drain electrode 136 exposed through the contact hole 136a, but the invention is not limited thereto. That is, the conductive layer 164 may be disposed in various other manners than that set forth herein, as long as the conductive layer 164 is electrically connected to the drain electrode 136.

Since the conductive layer 164 receives a data voltage from the drain electrode 136, the conductive layer 164 is not to be electrically connected to the common electrode 162. As illustrated in FIG. 2, the conductive layer 164 may be rectangular in the plan view and may not be connected to the common electrode 162, but the invention is not limited thereto. That is, the conductive layer 164 may be disposed in various other manners than that set forth herein, as long as the conductive layer is electrically connected to the drain electrode 136 and at the same time, can be electrically isolated from the common electrode 162.

The conductive layer 164 is not limited to the size illustrated in FIG. 2. That is, the conductive layer 164 may be disposed in various other sizes than that set forth herein, at various other locations than that set forth herein, as long as the conductive layer is electrically connected to the drain electrode 136 and at the same time, can be electrically isolated from the common electrode 162.

The conductive layer 164 and the common electrode 162 may include or be formed in a same layer among layers disposed on the first substrate 100 such as by using portions of a same material layer in manufacturing the LCD 10. In an exemplary embodiment of manufacturing an LCD, for example, the conductive layer 164 and the common electrode 162 may be each be formed of a transparent conductive material such as polycrystalline, monocrystalline, or amorphous indium tin oxide ("ITO") or indium zinc oxide ("IZO"), and the conductive layer 164 and the common electrode 162 may be formed at the same time by a single patterning process.

The second passivation layer 172 may be disposed on the common electrode 162, the organic layer 152 and the conductive layer 164, and may expose a portion of the conductive layer 164. That is, the second passivation layer 172 may include an opening defined therein which exposes a portion of the conductive layer 164. The exposed portion of the conductive layer 164 in the opening of the second passivation layer 172 may contact the pixel electrode 182. Accordingly, the conductive layer 164 and the pixel electrode 182 may be electrically connected to each other.

To prevent an AUA defect that may be caused in response to the pixel electrode 182 and the organic layer 152 being placed in contact with each other, the second passivation layer 172 and the conductive layer 164 may be disposed between the pixel electrode 182 and the organic layer 152. Since the second passivation layer 172 and the conductive layer 164 are disposed between the pixel electrode 182 and the organic layer 152, direct contact between the pixel electrode 182 and the organic layer 152 may be reduced or effectively prevented, and as a result, an AUA defect can be reduced or effectively prevented.

In the exemplary embodiment as illustrated in FIGS. 2 and 3, the opening defined by the second passivation layer 172 may expose a central portion of the conductive layer 164. That is, the second passivation layer 172 may cover the edges of the conductive layer 164 while exposing the central portion thereof.

More specifically, as illustrated in FIG. 3, in response to the conductive layer 164 contacting the entire exposed portion of the drain electrode 136 and extending along the sidewalls of the contact hole 136a to reach the top surface of the organic layer 152, the second passivation layer 172 may overlap a first portion of the conductive layer 164 on the top surface of the organic layer 152, and may also overlap a second portion of the conductive layer 164 in the contact hole 136a. As is apparent from FIG. 3, the second passivation layer 172 may directly contact the gate insulating layer 112.

As illustrated in FIG. 2, the opening defined in the second passivation layer 172 is rectangular, in the plan view, exposing the surface of the central portion of the conductive layer 164, but the invention is not limited thereto. That is, the opening defined in the second passivation layer 172 may be formed in various other shapes than that set forth herein, as long as direct contact of the pixel electrode 182 and the organic layer 152 can be prevented by the second passivation layer 172 and the conductive layer 164.

The second passivation layer 172 may include or be formed of an inorganic insulating material. In an exemplary embodiment, for example, the second passivation layer 172 may include silicon nitride or silicon oxide.

The pixel electrode 182 may form an electric field together with the common electrode 162 to rotate liquid crystal molecules (not illustrated) included in liquid crystal layer 300. The pixel electrode 182 may include a conductive material such as ITO or IZO, but the invention is not limited thereto.

The pixel electrode 182 may define a plurality of cutout patterns 182a therein. The cutout patterns 182a may have a rectangular shape, a closed loop shape or a fishbone shape. The cutout patterns 182a are illustrated in FIG. 1 as having a stripe shape, but the invention is not limited thereto. That is, the shape of the cutout patterns 182a may be appropriately selected. In response to a data voltage being applied to the pixel electrode 182, an electric field is formed in a direction from the pixel electrode 182 to the common electrode 162 which is below the pixel electrode 182.

The pixel electrode 182 is disposed on the conductive layer 164 and on the second passivation layer 172. More specifically, the pixel electrode 182 may contact the exposed portion of the conductive layer 164 in the opening defined in the second passivation layer 172. As a result, the pixel electrode 182 may be electrically connected to the conductive layer 164. Also, the pixel electrode 182 may be electrically connected to the drain electrode 136 through the conductive layer 164. That is, the pixel electrode 182 may be electrically connected to the drain electrode 136 through the conductive layer 164.

As illustrated in FIGS. 2 and 3, the pixel electrode 182 may cover or contact the entire exposed portion of the conductive layer 164 in the opening defined in the second passivation layer 172.

A portion of the pixel electrode 182 may extend be disposed in the contact hole 136a. The extended portion of the pixel electrode 182 in the contact hole 136a may form a contact. The second passivation layer 172 is disposed between the pixel electrode 182 and the common electrode 162 and thus insulates the pixel electrode 182 and the common electrode 162 from each other.

Since the second passivation layer 172 and/or the conductive layer 164 is interposed between the organic layer 152 and the pixel electrode 182, the pixel electrode 182 may not directly contact the organic layer 152. Accordingly, an AUA defect may be reduced or effectively prevented.

A light-blocking member 194 may be disposed on the second passivation layer 172. The light-blocking member 194 reduces or effectively prevents light leakage. The light-blocking member 194 may be disposed in a TFT region where the TFT is disposed and a non-pixel region (e.g., a region between pixels and/or a region where the gate line 102 and the data line 132 are disposed). The light-blocking member 194 may include a black organic polymer material including a black dye or pigment, or a metal or metal oxide such as Cr or chromium oxide.

The light-blocking member 194 is illustrated in FIG. 3 as being disposed on the second passivation layer 172, but the invention is not limited thereto. That is, the light-blocking member 194 may be disposed on the second substrate 200.

A column spacer 196, which maintains a cell gap, may be disposed on the light-blocking member 194, as illustrated in FIG. 3. The column spacer 196 may be formed in the TFT region, as illustrated in FIG. 3, but the invention is not limited thereto. That is, the location of the column spacer 196 is not particularly limited.

In some exemplary embodiments, the column spacer 196 may include or be formed of the same material as the light-blocking member 194. The column spacer 196 may be defined as one body with the light-blocking member 194 such as being an extension of the light-blocking member 194. In an exemplary embodiment of manufacturing an LCD, for example, the column spacer 196 and the light-blocking member 194 may include or be formed of the same material by the same patterning process such as through halftone mask exposure or slit mask exposure.

An alignment layer (not illustrated), which aligns liquid crystal molecules of the liquid crystal layer 300, may be disposed on the pixel electrode 182, the second passivation layer 172, the light-blocking member 194 and the column spacer 196.

The liquid crystal layer 300, which includes the liquid crystal molecules (not illustrated) with positive or negative dielectric anisotropy, may be interposed between the first and second substrates 100 and 200. The alignment layer may be disposed on a first surface of the second substrate 200, where the first surface faces the liquid crystal layer 300.

A distal end of the column spacer 196 may meet the second substrate 200 and may contact the second substrate 200. An alignment layer of the first substrate 100 and/or the alignment layer of the second substrate 200 may be interposed between the column spacer 196 and the second substrate 200.

A method of manufacturing the LCD 10 will hereinafter be described.

FIGS. 4 to 14 are cross-sectional views illustrating an exemplary embodiment of a method of manufacturing an LCD, according to the invention.

Referring to FIGS. 1, 3 and 4, the gate wiring 102, 104 and 106 is formed on the first substrate 100.

More specifically, a first metal layer (not illustrated) is formed on the first substrate 100, which includes a transparent material, for example, glass and quartz. The first metal layer may include or be formed of Al, Cu, Ag, Mo, Cr, Ti, Ta or an alloy thereof, and may include two or more layers having different physical properties from each other. The first metal layer may be deposited by, for example, sputtering. Thereafter, the first metal layer is patterned such as by photolithography using a first exposure mask, thereby forming the gate line 102 and the gate electrode 104. The gate electrode 104 may be a protrusion of the gate line 102 branched off from a main portion of the gate line 102.

Thereafter, referring to FIG. 5, the gate insulating layer 112 is formed on the gate wiring 102, 104 and 106. The gate insulating layer 112 may be formed by PECVD and may include silicon nitride (SiNx) or silicon oxide ($SiO_2$).

Thereafter, referring to FIG. 6, the semiconductor layer 122, the resistive contact layer 124, and the data wiring 132, 134, and 136, which includes the data line 132 intersecting the gate line 102, the source electrode 134 and the drain electrode 136, are formed on the gate insulating layer 112. The data wiring 132, 134 and 136, like the gate wiring 102, 104 and 106, may include or be formed of Al, Cu, Ag, Mo, Cr, Ti, Ta or an alloy thereof.

In an exemplary embodiment, the semiconductor layer 122, the resistive contact layer 124 and the data wiring 132, 134 and 136 may be formed by photolithography using a single mask. In the exemplary embodiment as illustrated in FIG. 6, a portion of the semiconductor layer 122 and the resistive contact layer 124 may remain below the data line 132. However, the invention is not limited to this exemplary embodiment. That is, in an alternative exemplary embodiment, a photolithography process for forming the semiconductor layer 122 and the resistive contact layer 124 and a photolithography process for forming the data wiring 132, 134 and 136 may be performed separately. In this alternative exemplary embodiment, the data line 132 may be formed directly on the gate insulating layer 112. The semiconductor layer 122 may form a TFT together with the gate electrode 104, the source electrode 134 and the drain electrode 136, and an exposed portion of the semiconductor layer 122 between the source electrode 134 and the drain electrode 136 may form a channel of the TFT. The semiconductor layer 122, the resistive contact layer 124 and the data wiring 132, 134 and 136 may be formed by various processes that are already well known in the art to which the invention pertains, and thus, a detailed description of the formation of the semiconductor layer 122, the resistive contact layer 124 and the data wiring 132, 134 and 136 will be omitted.

Thereafter, referring to FIG. 7, the first passivation layer 142 is formed on the first substrate 100 having the TFT thereon. The first passivation layer 142 may define an opening therein, which exposes a portion of the drain electrode 136.

More specifically, the first passivation layer 142 may be formed by depositing an inorganic insulating material, for example, silicon nitride or silicon oxide, on the first substrate 100 having the TFT thereon and patterning the inorganic insulating material to expose a portion of the drain electrode 136.

Thereafter, referring to FIG. 8, the color filter 192 is formed on the first passivation layer 142. The color filter 192 may be disposed in a pixel region, and examples of the color filter 192 may include R, G and B filters. In an exemplary embodiment, for example, the color filter 192 may be one of R, G and B filters. The color filter 192 may include or be formed of a photosensitive organic material including a pigment.

The color filter 192 may be formed by photolithography, inkjet printing or various other methods.

Thereafter, referring to FIG. 9, the organic layer 152 is formed on the first passivation layer 142 and the color filter 192. The organic layer 152 may define an opening therein, which exposes a portion of the drain electrode 136. The organic layer 152 may be formed by providing an organic material film on the first passivation layer 142 and the color filter 192 and patterning the organic material film.

The organic layer 152 may include or be formed of a material having excellent planarization performance and photosensitivity. The organic layer 152 may be formed by spin coating, slit coating or both.

The portion of the drain electrode 136 exposed through the opening in the first passivation layer 142 may substantially coincide with the exposed portion of the drain electrode 136 exposed through the opening in the organic layer 152, as illustrated in FIG. 9, but the invention is not limited thereto. The side surfaces of the first passivation layer 142 and the organic layer 152 at the respective openings therein, may be coplanar with each other, but the invention is not limited thereto. That is, the portion of the drain electrode 136 exposed through the opening in the first passivation layer 142 and the portion of the drain electrode 136 exposed through the opening in the organic layer 152 may be formed in various shapes other than that set forth herein, as long as the conductive layer 164 can be placed in contact with the drain electrode 136.

A portion of the gate insulating layer 112 may be exposed through the opening in the first passivation layer 142 and the opening in the organic layer 152, as illustrated in FIG. 9, but the invention is not limited thereto. That is, in an alternative exemplary embodiment, the portion of the drain electrode 136 may be exposed through the opening in the first passivation layer 142 and the opening in the organic layer 152, but the gate insulating layer 112 may not be exposed.

Thereafter, referring to FIG. 10, the conductive layer 164 is formed to contact the drain electrode 136 exposed through the opening in the first passivation layer 142 and the opening in the organic layer 152. The common electrode 162, which is electrically isolated from the conductive layer 164, is formed on the top surface of the organic layer 152. That is, the conductive layer 164 and the common electrode 162 are not connected to each other, but separated or isolated from each other. The conductive layer 164 and the common electrode 162 may be formed at the same time by the same photolithography process.

The conductive layer 164 may contact the entire exposed portion of the drain electrode 136, but the invention is not limited thereto. That is, in an alternative exemplary embodiment, the conductive layer 164 may contact only a portion of the exposed portion of the drain electrode 136.

Thereafter, referring to FIG. 11, the second passivation layer 172 is formed on the common electrode 162, the organic layer 152 and the conductive layer 164. The second passivation layer 172 may include an opening defined therein, which exposes a portion of the conductive layer 164.

The second passivation layer 172 may be formed by depositing an inorganic insulating material, for example, silicon nitride or silicon oxide, on the common electrode 162 and the conductive layer 164 and patterning the inorganic insulating material to expose the portion of the conductive layer 164.

Thereafter, referring to FIG. 12, the pixel electrode 182 is formed on the conductive layer 164 and the second passivation layer 172. More specifically, the pixel electrode 182 may be formed to contact at least a portion of the exposed portion of the conductive layer 164 in the opening of the second passivation layer 172. As a result, the pixel electrode 182 may be electrically connected to the conductive layer 164. Also, the pixel electrode 182 may be electrically connected to the drain electrode 136 through the conductive layer 164. That is, the pixel electrode 182 may be electrically connected to the drain electrode 136 through the mediation of the conductive layer 164.

To prevent an AUA defect, the pixel electrode 182 may be formed on the conductive layer 164 and the second passivation layer 172 so as to not directly contact the organic layer 152. Since the second passivation layer 172 and the conductive layer 164 are formed between the pixel electrode 182 and the organic layer 152, direct contact of the pixel electrode 182 and the organic layer 152 may be reduced or effectively prevented.

Thereafter, referring to FIG. 13, the light-blocking member 194 is formed on the second passivation layer 172. The light-blocking member 194 may be formed in an area where the liquid crystal molecules included in the liquid crystal layer 300 do not operate, for example, a TFT region and a non-pixel region (e.g., a region between pixels and/or a region where the gate line 102 and the data line 132 are disposed). The light-blocking member 194 may be formed of a black organic polymer material including a black dye or pigment, or a metal or metal oxide, such as Cr or chromium oxide.

Thereafter, the column spacer 196 is formed on the light-blocking member 194. As illustrated in FIG. 13, the column spacer 196 and the light-blocking member 194 may be integrally formed at the same time. In an exemplary embodiment, for example, the column spacer 196 and the light-blocking member 194 may be formed of the same material by the same patterning process through halftone mask exposure or slit mask exposure, but the invention is not limited thereto.

The column spacer 196 may be formed in the TFT region, as illustrated in FIG. 13, but the invention is not limited thereto. That is, the location of the column spacer 196 is not particularly limited.

Thereafter, referring to FIG. 14, an alignment layer (not illustrated) may be formed on each of the first and second substrates 100 and 200. Thereafter, liquid crystal molecules (not illustrated) with positive or negative dielectric anisotropy are applied onto the first substrate 100, thereby forming the liquid crystal layer 300. Thereafter, the first substrate 100 with the liquid crystal layer 300 formed thereon is combined with the second substrate 200.

Another exemplary embodiment of an LCD according to the invention will hereinafter be described.

FIG. 15 is an enlarged view of an exemplary embodiment of an area of an LCD 10-1 according to the invention, corresponding to area A of FIG. 1. FIG. 16 is a cross-sectional view of the LCD 10-1, corresponding to line III-III' of FIG. 1.

The LCD 10-1 is substantially the same as the LCD 10 of FIGS. 1 to 3 except for a few elements thereof, such as a conductive layer 164-1, a second passivation layer 172-1 and a pixel electrode 182-a, and thus will hereinafter be described, focusing mainly on differences with the LCD 10 of FIGS. 1 to 3.

Referring to FIGS. 15 and 16, the conductive layer 164-1 may be disposed to contact a portion of the exposed portion of a drain electrode 136 exposed at a contact hole 136a-1, which is formed in a first passivation layer 142 and an organic layer 152. The conductive layer 164-1 may thus be electrically connected to the drain electrode 136 at the contact hole 136a-1.

The conductive layer 164-1 may contact the entire exposed portion of the drain electrode 136 and may extend along, and cover, the entire sidewall of the contact hole 136a-1 to reach the top surface of the organic layer 152. The conductive layer 164-1 may extend to the top surface of the organic layer 152, but may be isolated or separated from a common electrode 162 which is also disposed on the organic layer 152.

The second passivation layer 172-1 may be disposed on the common electrode 162, the organic layer 152 and the conductive layer 164-1, and may expose a portion of the conductive layer 164-1. That is, the second passivation layer 172-1 may include an opening defined therein, which exposes a portion of the conductive layer 164-1.

The opening in the second passivation layer 172-1 may expose a central portion of the conductive layer 164-1, as illustrated in FIGS. 15 and 16. That is, the second passivation layer 172-1 may cover the edges of the conductive layer 164-1 while exposing the central portion thereof.

More specifically, as illustrated in FIG. 16, in response to the conductive layer 164-1 contacting the entire exposed portion of the drain electrode 136 and being extend along, and covering, the entire sidewall of the contact hole 136a-1 to reach the top surface of the organic layer 152, the second passivation layer 172-1 may overlap the edges of the conductive layer 164-1, which extend over the top surface of the organic layer 152.

The pixel electrode 182-1 may be disposed on the conductive layer 164-1 and the second passivation layer 172-1. More specifically, the pixel electrode 182-1 may contact a portion of the exposed portion of the conductive layer 164-1 at the opening of the second passivation layer 172-1. Accordingly, the pixel electrode 182-1 may be electrically connected to the conductive layer 164-1. Also, the pixel electrode 182-1 may be electrically connected to the drain electrode 136 through the conductive layer 164-1. That is, the pixel electrode 182-1 may be electrically connected to the drain electrode 136 through the mediation of the conductive layer 164-1.

As illustrated in FIGS. 15 and 16, the pixel electrode 182-1 may cover the entire exposed portion of the conductive layer 164-1 at the opening of the second passivation layer 172-1.

A portion of the pixel electrode 182-1 may be disposed in the contact hole 136a-1. The portion of the pixel electrode 182-1 in the contact hole 136a-1 may form a contact. The second passivation layer 172-1 is disposed between the pixel electrode 182-1 and the common electrode 162 and thus insulates the pixel electrode 182-1 and the common electrode 162 from each other.

Since the second passivation layer 172-1 or the conductive layer 164-1 is interposed between the organic layer 152 and the pixel electrode 182-1, the pixel electrode 182-1 may not directly contact the organic layer 152. Accordingly, an AUA defect may be reduced or effectively prevented.

While the invention has been particularly shown and described with reference to exemplary embodiments thereof, it will be understood by those of ordinary skill in the art that various changes may be made therein without departing from the spirit and scope of the invention as defined by the following claims. The exemplary embodiments should be considered in a descriptive sense only and not for purposes of limitation.

What is claimed is:

1. A liquid crystal display, comprising:
   first and second substrates facing each other;
   a liquid crystal layer disposed between the first and second substrates;
   a thin-film transistor disposed on the first substrate and including a semiconductor layer, a gate electrode, a source electrode and a drain electrode;
   an organic layer disposed on the thin-film transistor, the organic layer defining a contact hole therein which exposes a portion of the drain electrode;
   a conductive layer disposed on the organic layer and contacting the exposed portion of the drain electrode at the contact hole defined in the organic layer;
   a common electrode which is disposed on the organic layer and isolated from the conductive layer;
   a passivation layer disposed on the conductive layer and the common electrode, the passivation layer defining an opening therein which exposes a portion of the conductive layer; and
   a pixel electrode disposed on the passivation layer and on the conductive layer and contacting the exposed portion of the conductive layer at the opening defined in the passivation layer,
   wherein the opening defined in the passivation layer exposes a central portion of the conductive layer and the passivation layer in which the opening is defined covers edges of the conductive layer adjacent to the central portion thereof.

2. The liquid crystal display of claim 1, wherein the conductive layer and the passivation layer are each disposed between the pixel electrode and the organic layer such that the pixel electrode and the organic layer do not to contact each other.

3. The liquid crystal display of claim 1, wherein the conductive layer contacting the exposed portion of the drain electrode at the contact hole defined in the organic layer extends along a sidewall of the organic layer at the contact hole to be disposed on a top surface of the organic layer in which the contact hole is defined.

4. The liquid crystal display of claim 1, wherein the pixel electrode contacts an entirety of the exposed portion of the conductive layer at the opening defined in the passivation layer.

5. A liquid crystal display, comprising:
   first and second substrates facing each other;
   a liquid crystal layer disposed between the first and second substrates;
   a thin-film transistor disposed on the first substrate and including a semiconductor layer, a gate electrode, a source electrode and a drain electrode;
   an organic layer disposed on the thin-film transistor, the organic layer defining a contact hole therein which exposes a portion of the drain electrode;
   a conductive layer disposed on the organic layer and contacting the exposed portion of the drain electrode at the contact hole defined in the organic layer;
   a common electrode which is disposed on the organic layer and isolated from the conductive layer;
   a passivation layer disposed on the conductive layer and the common electrode, the passivation layer defining an opening therein which exposes a portion of the conductive layer;
   a pixel electrode disposed on the passivation layer and on the conductive layer; and
   contacting the exposed portion of the conductive layer at the opening defined in the passivation layer, and
   a gate insulating layer disposed between the gate electrode and the drain electrode,
   wherein the contact hole defined in the organic layer exposes a portion of the gate insulating layer.

6. The liquid crystal display of claim 5, wherein the passivation layer in which is defined the opening directly contacts the exposed portion of the gate insulating layer at the contact hole defined in the organic layer.

7. The liquid crystal display of claim 5, further comprising:
   a color filter disposed between the gate insulating layer and the organic layer in which the contact hole is defined.

8. The liquid crystal display of claim 1, further comprising:
- a light-blocking member disposed on the passivation layer in which the opening is defined.

9. A method of manufacturing a liquid crystal display, the method comprising:
- forming a thin-film transistor, which includes a semiconductor layer, a gate electrode, a source electrode and a drain electrode, on a first substrate;
- forming an organic layer which defines a contact hole therein exposing a portion of the drain electrode, on the thin-film transistor;
- forming a conductive layer which contacts the exposed portion of the drain electrode at the contact hole defined in the organic layer, on the organic layer;
- forming a common electrode which is disposed on the organic layer and isolated from the conductive layer;
- forming a passivation layer which defines an opening therein exposing a portion of the conductive layer, on the conductive layer and on the common electrode; and
- forming a pixel electrode which contacts the exposed portion of the conductive layer at the opening defined in the passivation layer, on the passivation layer and the conductive layer,
- wherein the opening defined in the passivation layer exposes a central portion of the conductive layer and the passivation layer in which the opening is defined covers edges of the conductive layer adjacent to the central portion thereof.

10. The method of claim 9, wherein the conductive layer and the passivation layer are each disposed between the pixel electrode and the organic layer such that the pixel electrode and the organic layer do not to contact each other.

11. The method of claim 9, wherein the conductive layer contacting the exposed portion of the drain electrode at the contact hole defined in the organic layer extends along a sidewall of the organic layer at the contact hole to be disposed on a top surface of the organic layer in which the contact hole is defined.

12. The method of claim 9, wherein the pixel electrode contacts an entirety of the exposed portion of the conductive layer at the opening defined in the passivation layer.

13. The method of claim 9, further comprising:
- forming a gate insulating layer between the gate electrode and the drain electrode,
- wherein the contact hole defined in the organic layer exposes a portion of the gate insulating layer.

14. The method of claim 13, wherein the passivation layer in which is defined the opening directly contacts the exposed portion of the gate insulating layer at the contact hole defined in the organic layer.

15. The method of claim 13, further comprising:
- forming a color filter between the gate insulating layer and the organic layer in which the contact hole is defined.

16. The method of claim 9, further comprising:
- forming a light-blocking member on the passivation layer in which the opening is defined.

17. The method of claim 16, further comprising:
- forming a column spacer on the light-blocking member, wherein the light-blocking member and the column spacer are integral.

18. The method of claim 9, wherein the conductive layer and the common electrode are formed at the same time using a single mask.

* * * * *